Patented Apr. 4, 1950

2,503,139

UNITED STATES PATENT OFFICE 2,503,139

PROCESS FOR THE MANUFACTURE OF ARTICLES OF CELLULAR STRUCTURE

Juan Antonio de Fábregues-Boixar Soler, Barcelona, Spain

No Drawing. Application January 25, 1947, Serial No. 724,462. In Spain January 25, 1946

3 Claims. (Cl. 18—53)

The invention relates to a process for the manufacture of porous sponge or cellular articles by inner molding particularly from resilient rubber or analogous materials.

Two parts have to be distinguished in a sponge mass: 1° the material which constitutes the mass of three-dimensional extensions, films and filaments; 2° the voids within said three forms.

It has already been proposed to prepare sponge rubber by inner molding, i. e. by coagulating the rubber mass in a mold previously filled with a granulated material, the grains of which correspond to the desired size of the cells of the final spongy or cellular structure, and by subsequent extraction of said granular material.

At first glance, it seems that, by only taking a receptacle the inner form of which corresponds to the outer form of the article to be produced and by filling it with grains representing the voids of the final cells, there would already exist the mold in which, after casting the fluid or liquefied material, the final article is obtained without more than removing the vehicle—if any—and the employed granules. However, this is not so. If, for instance, it is desired to obtain a rubber sponge article and a solution of rubber in benzene is cast into the mold filled with salt grains of the suitable size and form, a mass is obtained from which it is not possible to remove the grains, e. g. by means of water, because the grains will be almost completely embedded in rubber protecting them against the action of the water. In such a mold, the elements are missing which represent a communication between the cells and which allow a free passage to the dissolving or eliminating agent for removing the grains.

Because of this difficulty, the methods proposed heretobefore for the manufacture of sponges by inner molding did not give the desired result.

A primary object of this invention is to provide a process for preparing sponge or cellular articles in which the drawbacks of the known methods are avoided.

Other objects and advantages will be seen from a consideration of the specification and the claims.

The new process consists essentially in completing the mold, which already contains the grains, by filling it with a concentrated solution of a soluble salt, or simply with water, if the grains are soluble therein, and by pouring out these solutions afterwards. This treatment has the result that the surfaces of the grains and their points of contact with each other retain by capillarity some of the employed liquid which, whether or not the vehicle is removed, will occupy said surfaces and points of contact in sufficient quantity for securing a union between the various cells of the sponge material. In the examples given hereinafter this operation will be called "nourish the mold" and this will be the true inner mold of the eventual sponge.

The process of this invention may be used for rubber and similar substances which are able to present themselves temporarily or to acquire by fusion, dispersion, solution, suspension or the like, a fluid form.

The preparation of the grains may be carried out merely by comminution and sifting, or also by applying small drops of liquids or solutions to an endless moving belt which is coated with the material in powder form, and subsequently sifting it. In this manner, grains of a very regular size may be obtained quickly and conveniently from whatever powdery material.

For a better understanding of the invention, it will now be described with reference to some examples. It will be obvious to those skilled in the art that the invention is not limited to the particular materials and compositions since the examples are given primarily for purposes of illustration and the invention is to be construed as broadly as the appended claims permit.

EXAMPLE 1

*Rubber sponge prepared from a solution of synthetic rubber in benzene*

Grains of suitable size of sodium chloride are used (2 to 3 mm). After filling the mold with the grains, it is "nourished" with a warm concentrated solution of potassium chloride and allowed to cool down. Then the following composition is cast:

| | Kgs. |
|---|---|
| Synthetic rubber | 20 |
| Benzene | 80 |
| Sulphur | .5 |
| Zinc oxide | 1 |
| Zinc diethyl dithio carbamate | .15 |
| Barium sulphate | 19 |

Dyestuffs, antioxidants, etc., in sufficient quantity.

After the mold has been filled (if necessary by suction, centrifugation or the like) the benzene is removed by evaporation; then the mold is disassembled, and the block is, if desired, cut to pieces of the desired size, which are vulcanized during 15 min. at 110° C.

Wastes and shavings, if there are any, may be dissolved again in benzene and mixed with fresh crude rubber. The vulcanized pieces are treated with cold water to dissolve the grains, washed and dried.

EXAMPLE 2

Sponge rubber prepared from 30% latex

The mold is filled with comminuted potassium nitrate which have been sifted to obtain grains of a predetermined size only. The mold is then "nourished" with a saturated solution of potassium nitrate at about 60° C. and, after cooling down, filled up to the top of the grains with a mix of the following composition:

| | Gr. |
|---|---|
| Latex of 30% | 1100 |
| Zinc oxide | 15 |
| Sulphur | 7.5 |
| Zinc diethyldithiocarbamate | 3 |
| Diphenylguanidine | 1 |
| Ammonium acetate | 3 |
| Barium sulphate | 285 |
| Water | 1000 |

Dyestuffs, antioxidants, stabilizers in sufficient quantities.

After coagulation of the latex and decanting of the free water the product is dried, cut, and vulcanized during 30 minutes at 110° C. The vulcanized pieces are treated with cold water to dissolve the grains, washed and dried. The shavings are used as ordinary crude rubber. The potassium nitrate is recovered from the wash water.

EXAMPLE 3

Handles of sponge ebonite

The mold is prepared by introducing several layers of the mix described in the preceding example but containing an amount of sulphur equal to 50 per cent of the rubber content. After the last layer has dried, the mold is filled with grains of common salt and a composition is cast equal to the preceding but without the accelerator zinc diethyldithiocarbamate. After coagulating, decanting and drying, the product is vulcanized under pressure and washed to remove the grains.

What I claim is:

1. A process for the manufacture of materials of cellular structure and articles composed thereof from rubber and similar substances comprising the steps of placing in a mold adjoining grains of water-soluble salts, coating the grains with a thin film of a water-containing liquid capable of dissolving said salts, by pouring said liquid on said grains and then pouring out the excess of said liquid, said film establishing a capillary union and resultant contact between the grains, adding the sponge-forming material in the liquid state, solidifying said sponge-forming material, and treating the solidified mass with a solvent to remove the grains.

2. A process for the manufacture of materials of cellular structure and of articles composed thereof from rubber-like substances comprising the steps of filling a mold with water-soluble grains the size and form of which correspond to the cells of the finished sponge, pouring a concentrated salt in water solution into the mold, and allowing said solution to remain long enough to dissolve a small amount of said grains, then pouring out the excess of said solution, thereby retaining small amounts of said solution between adjoining points of said grains by capillarity, charging liquid sponge-forming material into the mold, solidifying said sponge-forming material, and dissolving out said grains.

3. A process for the manufacture of materials of cellular structure and of articles composed thereof from rubber-like substances comprising the steps of filling a mold with water-soluble grains the size and form of which correspond to the cells of the finished sponge, pouring water into the mold, and allowing said water to remain long enough to dissolve a small amount of said grains, then pouring out the excess of said water, thereby retaining a thin film of liquid between adjoining points of said grains by capillarity, charging liquid sponge-forming material into the mold, solidifying said sponge-forming material, and dissolving out said grains.

JUAN ANTONIO DE FÁBREGUES-BOIXAR
SOLER.

REFERENCES CITED

The following references are of record in the file of this patent:

UNITED STATES PATENTS

| Number | Name | Date |
|---|---|---|
| 353,631 | Gilman | Nov. 30, 1886 |
| 415,330 | Payen | Nov. 19, 1889 |
| 1,611,056 | Mostny | Dec. 14, 1926 |
| 2,006,687 | Riddock | July 2, 1935 |
| 2,017,398 | Faldini | Oct. 15, 1935 |
| 2,175,798 | Hauser | Oct. 10, 1939 |
| 2,381,706 | Wilson | Aug. 7, 1945 |

OTHER REFERENCES

Great Britain, Int. Latex Proc. 418,757, Oct. 31, 1934.